(12) United States Patent
Lindsay

(10) Patent No.: US 8,113,964 B2
(45) Date of Patent: Feb. 14, 2012

(54) METHODS AND SYSTEMS FOR IDENTIFYING THE LAUNCH POSITIONS OF DESCENDING GOLF BALLS

(76) Inventor: Norman Matheson Lindsay, Amersham (GB)

( * ) Notice: Subject to any disclaimer, the term of this patent is extended or adjusted under 35 U.S.C. 154(b) by 313 days.

(21) Appl. No.: 12/442,792

(22) PCT Filed: Sep. 27, 2007

(86) PCT No.: PCT/GB2007/003681
§ 371 (c)(1),
(2), (4) Date: Mar. 25, 2009

(87) PCT Pub. No.: WO2008/038005
PCT Pub. Date: Apr. 3, 2008

(65) Prior Publication Data
US 2010/0029415 A1    Feb. 4, 2010

(30) Foreign Application Priority Data

| Sep. 27, 2006 | (GB) | 0619014.4 |
| Mar. 21, 2007 | (GB) | 0705382.0 |
| May 26, 2007 | (GB) | 0710129.8 |
| Jun. 29, 2007 | (GB) | 0712687.3 |

(51) Int. Cl.
*A63B 69/36* (2006.01)
(52) U.S. Cl. ........... 473/150; 473/155
(58) Field of Classification Search ........ 473/131, 473/150–153, 155, 407, 409
See application file for complete search history.

(56) References Cited

U.S. PATENT DOCUMENTS

| 4,883,239 | A | * | 11/1989 | Lachmann et al. | 244/3.15 |
| 5,401,026 | A | * | 3/1995 | Eccher et al. | 473/199 |
| 5,631,654 | A | | 5/1997 | Karr | |
| 5,647,558 | A | * | 7/1997 | Linick | 244/3.11 |
| 5,700,204 | A | * | 12/1997 | Teder | 473/199 |
| 5,938,545 | A | * | 8/1999 | Cooper et al. | 473/407 |
| 6,179,720 | B1 | | 1/2001 | Rankin et al. | |
| 6,547,671 | B1 | * | 4/2003 | Mihran | 473/131 |
| 6,607,123 | B1 | | 8/2003 | Jollifee et al. | |
| 7,321,330 | B2 | * | 1/2008 | Sajima | 342/59 |
| 2004/0032970 | A1 | * | 2/2004 | Kiraly | 382/103 |
| 2005/0215338 | A1 | * | 9/2005 | Miyamoto | 473/155 |
| 2007/0167247 | A1 | | 7/2007 | Lindsay | |
| 2008/0182685 | A1 | * | 7/2008 | Marty et al. | 473/407 |
| 2009/0036237 | A1 | * | 2/2009 | Nipper et al. | 473/409 |

FOREIGN PATENT DOCUMENTS

GB    2294403 A    5/1996
(Continued)

*Primary Examiner* — Dmitry Suhol
*Assistant Examiner* — Jason Yen
(74) *Attorney, Agent, or Firm* — Davis & Bujold, P.L.L.C.

(57) ABSTRACT

Identification of the tee-off bay (52;53) from which a golf ball landing on a golf-range target (51) originated, is made by calculating an estimate of flight duration ($Edur_k$) of the descending ball as a function of the measured angle ($\beta$) of descent in elevation, and, in respect of each ball launched from the bays (52,53), comparing this estimate for a match with a measured interval between the launch of the respective ball and descent of the descending ball. The originating bay (52;53) of the launched ball for which there is the closest match is identified as the origin of the descending ball, and ambiguity or uncertainty between which bay (52,53) is identified is resolved through comparison of the measured angle ($\alpha_{des}$) of descent in azimuth of the descending ball with estimates ($Edir_k$) of it calculated for each launched ball, and through similar comparison in respect of a calculated deceleration ratio ($Edec_k$) and flight duration ($Dur_k$).

20 Claims, 6 Drawing Sheets

FOREIGN PATENT DOCUMENTS

| | | | |
|---|---|---|---|
| JP | 8224331 A | | 9/1996 |
| WO | WO2005/116678 | * | 5/2005 |
| WO | WO2006/002640 | * | 7/2005 |
| WO | 2005/116678 A2 | | 12/2005 |
| WO | 2006/002640 A1 | | 1/2006 |

* cited by examiner

METHODS AND SYSTEMS FOR IDENTIFYING THE LAUNCH POSITIONS OF DESCENDING GOLF BALLS

This application is a National Stage completion of PCT/GB2007/003681 filed Sep. 27, 2009, which claims priority from British patent application serial no 0712687.3 filed Jun. 29, 2007, which claims priority from British patent application serial no. 0710129.8 filed May 26, 2007, which claims priority from British patent application serial no. 0705382.0 filed Mar. 21, 2007, which claims priority from British patent application serial no. 0619014.4 filed Sep. 27, 2006.

FIELD OF THE INVENTION

This invention relates to methods and systems for identifying the launch positions of descending golf balls. The methods and systems of the invention have application, for example, in the context of golf shots made on golf driving ranges and other golf facilities.

BACKGROUND OF THE INVENTION

According the invention there is provided in one aspect a method, and in another aspect a system, for identifying in respect of a descending golf ball the position from among a plurality of launch positions from which the ball was launched, comprising a step of, or means for, measuring descent parameters of the descending ball to derive at least the time of descent of the descending ball and a measure dependent on its angle of descent in elevation, a step oft or means for, calculating an estimate of flight duration of the descending ball as a function of the measure of descent angle, a step of, or means for, measuring in respect of each launch position the interval of time between the launch of a ball from that position and the time of descent of the descending ball, a step of, or means for, comparing the interval of time measured in respect of each launch position with the calculated estimate of flight duration of the descending ball to determine for which of the launch positions the respective interval is a close match with the calculated estimate, and the step of, or means for, identifying the position from which the descending ball was launched with the launch position for which the close match exists.

A measure of the descent angle in elevation of the descending ball may be derived from measurements of component velocities of its descent trajectory.

References to 'descent' of a golf ball are intended to refer to the end portion of the carry trajectory of the ball as distinct from any part of its subsequent bounce or roll trajectory. Also, a 'descending golf ball' is intended to refer to a flying golf ball near the end of its carry trajectory and preferably within the last 10% of the trajectory. The end of the carry trajectory is the point where the ball hits a 'target' some distance from the initial launch position. The launch position may typically be, for example, one of several 'tee-off bays' of a driving range.

The present invention is applicable to all golf shots but is especially applicable to shots where the net aerodynamic force (i.e. the vector addition of lift and drag forces) is greater than 1.0 meters per second per second (m/s$^2$) but more especially greater than 10 m/s$^2$.

An aim of the present invention is to provide methods and systems of identifying golf shots that do not rely on flight prediction or trajectory tracking and do not require golf balls that are specially marked or electronically tagged or the like.

Flight prediction methods require expensive ball-launch measurement equipment capable of measuring the spin components of a ball and sometimes require special balls. Flight prediction is also subject to significant non-systematic errors caused by blustery wind and/or random variations in the aerodynamic properties of balls, which change due to surface degradation. Flight prediction methods can be enhanced by measurement of ball-landing positions and flight durations. However, systems that rely on measurement of only landing positions and times are inadequate since most of the information about a ball's flight history is destroyed on landing. Systems that identify individual golf shots using prediction of ball flight and measurement of landing positions are described in U.S. Pat. No. 6,179,720 and US-A-2007/0167247.

Trajectory tracking methods (such as video tracking or radar tracking systems) are very expensive, require large data processing means and may not work reliably when there are multiple concurrent balls in the flight space. Typically, one or more video cameras or radar tracking devices lock onto the flight path of one ball at a time and track that ball throughout its flight from initial impact to at least the final landing spot. This means that the cameras or radars must capture data almost continuously for several seconds whereas in the present invention measurements of the ball trajectory is only required for a few milliseconds just after initial impact and just prior to landing on the outfield. GB-A-2294403 describes a method of identifying golf shots by video tracking combined with swing measurements.

Identifying individual balls with tagging means such as embedded RFID chips is costly and the mechanical means of collecting balls to decode the RFID data is cumbersome and unreliable. Systems that identify individual golf shots using RFID tagging are described in JP-A-8224331 and also in U.S. Pat. No. 6,607,123.

Measurement of descent parameters, and of launch parameters, may utilise electro-mechanical, electro-acoustic, electro-magnetic, electro-optical, Doppler microwave radar, ultrasonic Doppler, high-speed video or any other technology that provides electronic measurement suitable for signal processing.

The measurement of the descent parameters may be made typically as the ball approaches a 'target' in the driving-range outfield. The target may be a marked-out circular, oval or rectangular area or the like or may be a landscaped golf green, mimicking a real golf course green. Various alternatively target designs may be used. For example, earthworks or structures resembling large archery targets, water features or large bunkers where balls land and disappear without bouncing out, and sundry other forms. Alternatively, the measurement may be made as the descending ball is about to land on any part of the entire outfield or a substantial part of it. Preferably, but without limitation, the descent parameters are measured within a short distance from the end of a ball's carry (e.g. in the final 5%, or more preferably the final 2% of the carry distance).

Limiting the extent of the measurement range of the descent reduces the cost of the measurement apparatus and improves measurement reliability. In a preferred embodiment, the descent parameters are measured within less than 2 meters of the landing surface or ground level and with apparatus that is itself less than 2 meters above ground level. Restricting the height of sensing apparatus in the outfield makes it much less obtrusive on the outfield landscape, which is highly desirable.

A preferred means for measuring the descent parameters at each target uses at least four 'detection planes'. The said detection planes comprise fan beams with very small angular field of view normal to the detection plane and wide fields of view in the planes of the detection planes. Means are provided to sense the angular position (within the fan beam) and the instants of time when balls pass through the detection planes. Typically, the detection planes are arranged in two co-planar pairs that are parallel and offset, but pointing along different directions, so that the two-dimensional position of a ball as it passes through the common field-of-view plane can be found by triangulation. The time difference between the instants when the ball passes through the detection planes, and the offset separation distance between the planes containing the centres of the fields-of-view give a measurement of the ball's velocity vectors and its instantaneous position in space. Preferably, but without limitation, the fields of view of all the detection plane sensors are horizontal, or nearly so and positioned close to the surface of the outfield surface.

Measurements of parameters of launched balls are desirably made by means that is of low cost, and has reliability and wide 'shot acceptance'. In this context, 'shot acceptance' means the ability of the measuring means to measure all types of shots as they leave the tee-off spot in a wide variety of speeds and directions. Preferably, initial flight parameters are measured over a short length of a ball's initial trajectory (e.g. not more than 5 meters but more preferably less than 2 meters) so that balls struck from adjacent tee-off bays do not interfere with the measurement. However, any means of measuring the initial launch parameters of one golf ball in the presence of other flying golf balls may be employed. The signal processing means requires data that identifies each tee-off bay in the driving range and records the range, azimuth direction and height of each tee-off spot relative to each target in the golf facility.

The time of impact of balls at the tee-off bays can be measured by sensing the impact sound using one or more microphones. If required, a crude measurement of ball launch speed and direction may be derived from analysis of signals from several microphones, possibly configured as a phased array. Alternatively, the time of impact can be measured by optical means, for example by detecting the passage of the ball through one or more optical detection planes. The said optical means may be configured to measure the time of impact and optionally at least one of ball launch speed, launch azimuth angle and launch elevation angle of each struck ball.

SUMMARY OF THE INVENTION

Whereas in one form of the invention standard golf balls can be used, it can be advantageous to use golf balls with a retro-reflective surface. The advantages of retro-reflective golf balls are twofold. Firstly, the balls are much easier to detect by optical sensor means, especially at long range. Secondly, at night-time or in poor ambient light conditions, the balls are much more visible to the human eye when illuminated by a light source close to the golfer. This allows much reduced lighting power and intensity, which is environmentally desirable.

The main disadvantages of retro-reflective golf balls include the added cost of manufacture and possible degradation of the retro-reflective surface with frequent use. It is thus an aim of the invention to provide methods and systems for identifying golf shots that are compatible with standard, unmodified gold balls and also methods and systems that are designed to operate with retro-reflective golf balls.

It is also an aim to provide methods and systems that are substantially immune to differences in the aerodynamic properties of different types and condition of golf balls. Whereas the diameters and masses of different types of golf ball are all closely similar, their dimple patterns vary significantly and this gives rise to substantial differences in carry length and flight duration under identical launch conditions. This is illustrated in a paper describing USGA research on golf ball flight prediction (Quintavalla, S. J. 2002. A Generally Applicable Model for the Aerodynamic Behavior of Golf Balls. In *Science and Golf IV*, ed. E. Thain, 346-348. London: Routledge). In this paper, Quintavalla uses a mixture of ball types that exhibit variations in carry length and flight duration due to dimple pattern differences only, with carry length varying by 25 meters (with average carry length of 238 meters) and flight duration varying by 1.0 second (with average flight duration of 6.3 seconds). Other dimple patterns not included in this research may well exceed these differences and the effect of surface degradation will be even more critical as the degradation becomes severe.

It is thus evident that aerodynamic lift and drag forces affect golf balls with different surface characteristics differently. However, lift and drag forces for short approach shots (e.g. up to 25 meters) are very much weaker than the gravity force so the trajectory closely approximates a parabola, with the descent angle and speed equal to the launch angle and speed (on a horizontal playing surface). A 'bird's eye view' of a short chip shot shows that the ball always flies substantially straight without significantly veering right or left (i.e. without slicing or hooking). Again, this is because sidespin and/or crosswinds have negligible effect on golf ball flight at low velocities. It has been found that if you measure the ball's descent speed, you can tell when the ball was hit, assuming that the ball was launched in a given horizontal plane (e.g. at ground level). Moreover, if you also measure its azimuth direction and speed, you can calculate accurately the position of the initial impact. Thus, you can identify who played the shot irrespective of the ball's dimple pattern or general surface condition. This illustrates the principle of the present invention as applicable to short chip shots.

However, driving ranges are sometimes tiered so it cannot be assumed that a ball was launched from ground level. For the case where a short pitch shot is launched very steeply, errors in measurement of its descent parameters make it unreliable to estimate whether the ball was hit from an upper or lower tier. For this reason, it is preferable to measure the time of impact for all shots. This additional information allows reliable identification of where and when short range golf shots are hit. Time of impact also gives a record of how many balls are played in each bay. This monitors customers' usage of balls and helps to prevent ball theft.

As the launch speed and flight distance increase, the lift and drag forces increase. The forward speed rapidly reduces during flight, making the descent portion of the trajectory much shorter than the ascent portion. Hence, the descent elevation angle is larger than the launch elevation angle and the descent speed is less than the launch speed. Flight simulations for a wide range of shots and wind conditions show that for a given flight length, the flight duration of any shot can be estimated very accurately just from knowledge of the descent angle. When a ball lands on target, optical or radar sensors or the like measure its descent component velocities just before it lands. A central computer then estimates the flight duration and seeks to match it with the interval since the hit time of each recently-hit ball.

In many cases, the process of matching one estimated and one actual hit time is all that is necessary to identify a golf shot. However, in general more than one estimated hit time and actual hit time needs to be considered to make a reliable identification. Thus, to identify the initial tee-off position of a given descending golf ball, it is sometimes necessary to try to match one set of descent parameters (for one particular shot)

with the initial launch parameters of one of a plurality of 'possible shots' that happen to have nearly simultaneous impact times.

To clarify the description herein, it is desirable to denote parameters relating to a 'possible shot' with the subscript k, where k takes a value of 1 to K and K is the total number of 'possible shots' determined by the identification process and is never more than the number of players using the facility.

It is found that the expected flight duration $\text{Edur}_k$ for the kth possible shot can be very accurately estimated from the following equation:

$$\text{Edur}_k = C1_k + C2_k \times \beta \qquad (1)$$

In the above equation; $\text{Edur}_k$ is the expected flight duration in seconds; $C1_k$ and $C2_k$ are known constants dependent on the carry distance from the kth tee-off bay to the descent position; and $\beta$ is the measured ball descent angle at the descent position in degrees.

Other forms of computation may be used. For example the right-hand side of Equation (1) may include additional terms dependent on other descent parameters, and on the average wind speed along the flight direction and on the air density. Optionally, the computation may be implemented with a look-up table or other form of algorithm.

In one form of the invention, the value of $\text{Edur}_k$ is determined by a computation dependant solely on the descent elevation angle $\beta$ and carry distance. More preferably, $\text{Edur}_k$ is dependant on descent elevation angle, carry distance and at least one of: the descent absolute velocity, the descent azimuth angle, the wind speed in the direction of the ball flight and the air density.

In addition to $\text{Edur}_k$, two other parameters are sometimes used in the present invention. These are, expected direction $\text{Edir}_k$ and expected deceleration ratio $\text{Edec}_k$. Whereas $\text{Edur}_k$ is estimated using only descent parameters or descent parameters combined with wind parameters, the expected direction $\text{Edir}_k$ and expected deceleration ratio $\text{Edec}_k$ are calculated from both launch and descent parameters combined with wind parameters.

The expected direction or azimuth bearing angle for the kth possible shot $\text{Edir}_k$ can be found from the following equation:

$$\text{Edir}_K = \alpha F_k + C3_k \times (\alpha F_k - \alpha L_k) \qquad (2)$$

In the above equation $C3_k$ is a constant, $\alpha L_k$ is the azimuth launch angle measured at the kth tee-off bay and $\alpha F_k$ is the azimuth angle of the position of the descending ball relative its initial position at the kth tee-off bay. Angles $\text{Edir}_k$, $\alpha L_k$ and $\alpha F_k$ are conventionally measured clockwise from a fixed reference direction.

In one form of the invention, the value of $C3_k$ is preferably 1.0 for all values of k. More preferably $C3_k$ is dependent on carry distance and at least one of: crosswind magnitude and direction, carry deviation, total wind speed and direction, launch elevation angle, launch speed, carry duration and air density.

In the absence of sidespin and crosswind, and when the tee-off bay is correctly matched, the term $(\alpha F_k - \alpha L_k)$ is zero, i.e. the ball travels along a straight line (in bird's eye view) from the tee-off point to the descent position. When sidespin and/or crosswind cause a ball to deviate from the straight line, it is found by simulation that Equation (2) can give a very accurate prediction of the descent azimuth direction even for very large variations in sidespin and crosswind.

Comparing different values of $\text{Edir}_k$ to the actual azimuth direction at descent (derived from the measurement of descent parameters) provides a means of identifying the correct tee-off bay corresponding to a given descending ball.

$\text{Edec}_k$ is a dimensionless parameter that is related to the overall deceleration of a ball's horizontal velocity and is defined as the ratio of its horizontal velocity at launch to its horizontal velocity at descent. This ratio is strongly dependent on carry duration and distance. For short chip shots the ratio approaches unity since there is negligible change in horizontal velocity. For long drive shots, the ratio is typically 3.0 or more. $\text{Edec}_k$ is preferably found from the following equation:

$$\text{Edec}_k = C4_k = C5_k \times \text{Dur}_k \qquad (3)$$

In the above equation, $C4_k$ and $C5_k$ are constants and $\text{Dur}_k$ is a 'possible duration' value corresponding to one of a number of tee-off bays. Thus, $\text{Edec}_k$ and $\text{Dur}_k$ each have a plurality of values and comparing each $\text{Edec}_k$ to values of the deceleration ratio found from the ratios of actual launch and descent velocities provides a means of identifying the correct tee-off bay.

The values of $C4_k$ and $C5_k$ are preferably dependent on the achieved carry distance and initial launch angle of a shot; but more preferably dependent on carry distance, launch angle, wind speed, wind direction and air density.

The parameters $\text{Edur}_k$, $\text{Edir}_k$ and $\text{Edec}_k$ each have a different error distribution that can be determined by analysing actual measured data as it becomes available. Frequently, correctly matching expected to actual parameters can be achieved with 100% certainty. This will usually be the case when there are only a few players using a facility according to the invention and the hit times of their shots are separated by a few seconds. However, it will also occur frequently at busy times. The records of these '100% certainty' shots plus records of the prevailing atmospheric and wind conditions can be used to refine the shot identifying algorithms and accumulate error distribution data.

A preferred method of identifying the tee-off bay corresponding to a given descending ball is to first base the identification solely on a match between one of K possible carry durations $\text{Dur}_k$ (k=1, 2, ... K) and the corresponding expected durations $\text{Edur}_k$. The number K can be made dependent on the carry distance and on the wind conditions and chosen so as to only include all shots that were hit within achievable duration times. Alternatively, a default value for K can be set by including all shots that were hit during the previous 10 seconds. The K possible carry durations $\text{Dur}_k$ are equal to the time differences $(t_D - t_k)$ where $t_D$ is the time at the instant of measuring descent and $t_k$ is the time of impact of a shot at the $k^{th}$ tee-off bay. In some instances there will be only one close match, with other shots miss-matching by 3-sigma or greater. In this event it is safe to assume that the single match is correct.

In the event that two actual impact times match $\text{Edur}_k$ within 3-sigma (or some other error limit), the matches are then preferably made using at least two of three event probabilities $P(\text{Dur}_k)$, $P(\text{Dir}_k)$ and $P(\text{Dec}_k)$ that are found from the error distributions. $P(\text{Dur}_k)$ is defined as the complement of the probability of the event that an actual carry duration falls within $\pm(\text{Edur}_k - \text{Dur}_k)$ about $\text{Edur}_k$. Because $\text{Edur}_k$ is the most probable duration value (found from analysing a huge sample of previous shots) the value of the cumulative distribution function $F(\text{Edur}_k)$ is 0.5 whereas $F(\text{Dur}_k)$ will take some value above or below 0.5 depending on whether it is larger or smaller than $\text{Edur}_k$ respectively. We thus define $P(\text{Dur}_k)$ as follows;

$$P(\text{Dur}_k) = 1 - 2 \times |F(\text{Dur}_k) - 0.5| \qquad (4)$$

When the values of $\text{Edur}_k$ and $\text{Dur}_k$ are very close, the probability $P(\text{Dur}_k)$ approaches unity, conversely, when the values differ by 3-sigma or more, $P(\text{Dur}_k)$ approaches zero.

$P(Dir_k)$ and $P(Dec_k)$ are defined in equivalent manner from the direction error distribution and deceleration ratio error distribution. The correct match is assumed to be the shot that has a maximum joint probability, which can be either $P(Dur_k, Dir_k)$ or $P(Dur_k, Dec_k)$ or more preferably, $P(Dur_k, Dir_k, Dec_k)$.

It should be noted that there is some correlation between duration and deceleration so it can be argued that $Dur_K$ and $Dec_K$ are not independent events. However, the errors between estimated and actual parameters are extremely small and due to non-systematic measurement errors and variations in un-measured parameters such as backspin and ball roughness. It is thus the case that errors in $Edur_k$ are independent of errors in $Edec_k$ and so it is valid to say that the joint probability $P(Dur_k, Dec_k)$ equals the product of the individual probabilities.

In a hypothetical example, if the errors in $Edur_k$, $Edir_k$ and $Edec_k$ have normal distribution with 1-sigma values of 0.1 seconds, 0.7 degree and 0.1 respectively, and:

| | |
|---|---|
| $Edur_2$ = 4.32 seconds | $Dur_2$ = 4.32 seconds |
| $Edir_2$ = 81.5 degrees | $Dir_2$ = 85.0 degrees |
| $Edec_2$ = 2.2 | $Dec_2$ = 2.4 |

Then: $P(Dur_2)=1$ $P(Dir_2)=0$ $P(Dec_2)=0.046$

In the above example the expected duration of a descending ball matched perfectly with the actual hit time of the second possible shot (k=2), so $P(Dur_2)$ equals 1.0. However, $P(Dir_2)$ is zero because the difference between expected direction and actual direction is much greater than 3-sigma. Thus, the joint probability of the second candidate shot being the correct match is zero so this shot does not match.

BRIEF DESCRIPTION OF THE DRAWINGS

Methods and systems in accordance with the present invention will now be described, by way of example, with reference to the accompanying drawings, in which.

DETAILED DESCRIPTION OF THE PREFERRED EMBODIMENTS

Reference axes X, Y and Z are shown for convenience in conveying orientation where this is appropriate in certain of the figures to which reference is made in the following description. In this respect, the Z-axis is vertical and points upwards, the Y-axis is horizontal and points downrange (i.e. along the general line of flight of a golf shot) and the X-axis is orthogonal to Y and Z and points in the left-to-right direction, looking downrange.

Figure 1:
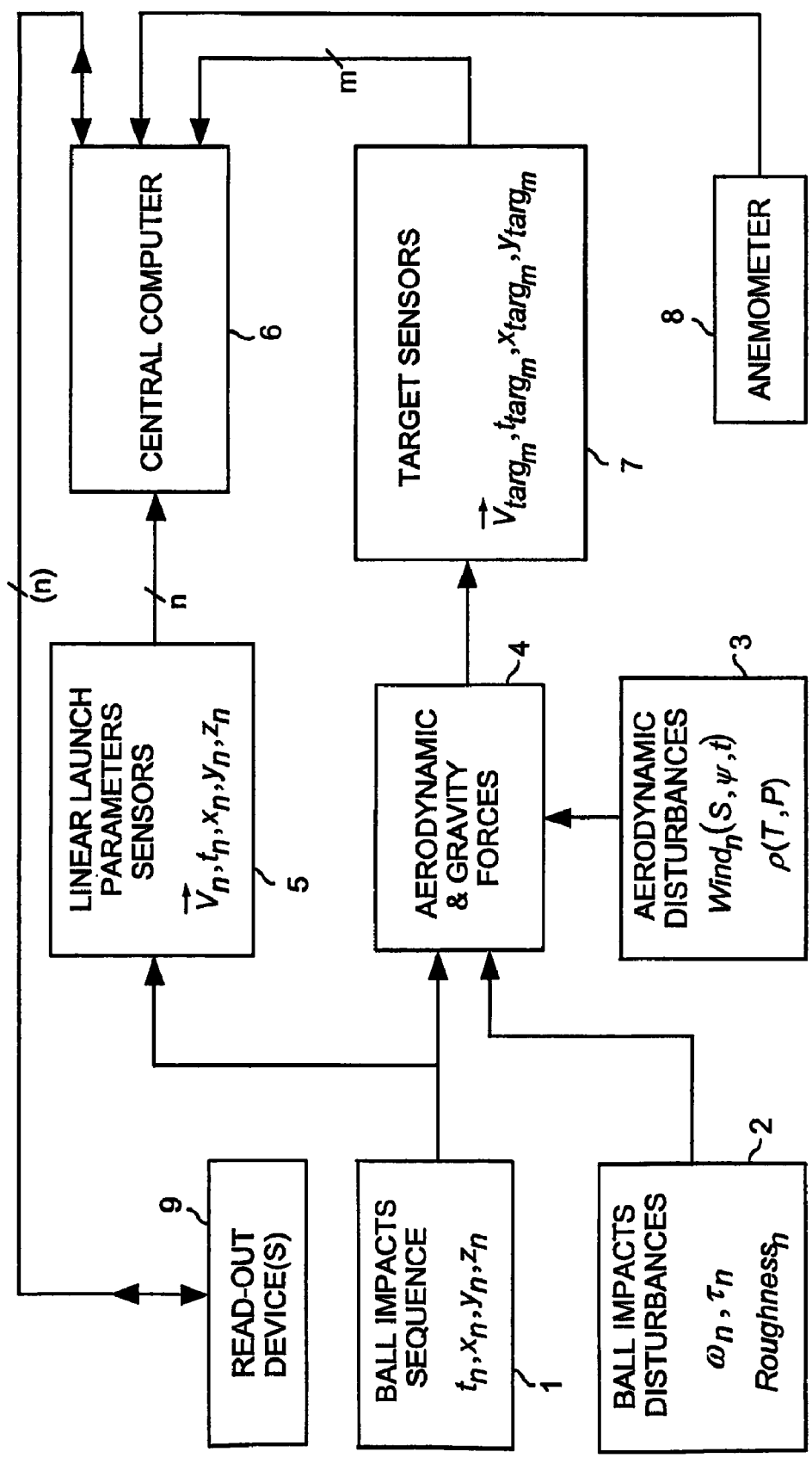
FIG. 1 is a logic block diagram of a system according to the invention for use in providing shot identification means in a golf facility.

The block diagram of FIG. 1 outlines the top level system for a golf facility according to one aspect of the invention where several players hit golf balls into the same general area and sensing means are provided to identify the initial tee position of every shot.

Block 1 represents the primary input, which is a sequence of n balls hit at random times $t_n$ from random tee-off positions having co-ordinates $x_n$, $y_n$, and $z_n$. Blocks 2 and 3 represent secondary inputs comprising various 'disturbances' or un-measured inputs such as a ball's spin rate ω, its spin axis tilt τ, its roughness, the wind speed and direction at successive instants along its flight path and the air density ρ, which varies with atmospheric pressure and temperature.

Block 4 represents the force of gravity and the aerodynamic lift and drag forces experienced by a ball throughout its flight, all of which determine the shape and duration of the flight. Block 5 represents the launch analysers that measure the linear parameters of each ball after impact where the said linear parameters comprise the vector velocity, the position co-ordinates at impact and the time of impact. Typically, the launch analysers do not measure the spin parameters as this measurement is difficult and requires expensive equipment. Data from the launch analysers are fed to a central computer 6.

Target sensors 7 also send data to the computer 6. The data measured by the target sensors 7 comprise the vector velocities and position co-ordinates of descending balls. Since not all balls in the n ball impact sequence 1 reach a target, the sample of balls measured by the target sensors 7 is a sub-set m of the n ball impacts (m<n). Alternatively, the target sensors can extend across the entire outfield so that all the balls that reach the outfield are measured. Optionally, data from one or more anemometers 8 can be sent to the computer.

The computer 6 processes the data from the various inputs to determine which tee position (and thus which player) corresponds to each of the m balls measured by the target sensors 7. When a player successfully lands a ball on a target, the computer 6 sends a score indication to a read-out device 9. The read-out device 9 may be a central device serving all the users of the facility. For example, once a player has finished a session in a driving bay, he or she can collect a print-out showing the scores for each shot. Additionally, each bay can be provided with individual score indicating means, which can be simple devices based on an audible tone, LED lamp indicators or the like, or more sophisticated means such as touch-screen displays.

In one preferred embodiment, the system is provided with two or more means of displaying scores and other information. Flags on the outfield mark the centres of each of several targets and each flag can be provided with three differently coloured LED beacons that are positioned and focussed so as to be easily visible to players in the tee-off bays. A simple form of scoring may be employed such as a score of one, two or three points for shots that land within 10%, 5% or 2% range of a target respectively with (say) corresponding red, white or blue beacon light. The light from a beacon is preferably pulsed on and off so as to be more noticeable and allowed to gradually extinguish over a few seconds after the scoring shot is complete. The flag-mounted beacons on the target areas would provide one indication means and parallel second indication means can be provided within each tee-off bays. These second indication means could be a sound signal or matching coloured LED indicators or the like that are only activated in a tee-off bay when a scoring shot is hit from that bay.

One advantage of a simple sounder or LED indicator is that it can be very low-cost and very rugged and thus less vulnerable to theft or vandalism compared to more sophisticated devices. However, players often prefer a computer-generated display and touch-screen facilities or the like and such displays may be permanently installed. Alternatively, rather than providing these displays as permanently built-in equipment they can advantageously be provided as portable units. Such portable units may be purpose-designed displays that are optionally hired by players for the duration of their games or may be a user-owned laptop computer or hand-held device such as a personal digital assistant (PDA) or a 'smartphone' or the like. Modern PDA's and laptops are often equipped with Bluetooth™ short-range data communication so a suitable software application can be installed into a user's personal mobile computer so that it can communicate with the shot identification and scoring system, which must also be Bluetooth™ enabled. Any suitable wireless communication standard may be used including radio and infrared technology. In addition to shot-by-shot scoring, the software application can provide many other services such as on-line booking and payment, multi-player scoring, competition registration, shot analysis, individual performance history, etc.

Typically, players on the facility are provided with an electronically readable 'playcard' or equivalent device that contains a user identification code. All tee-off bays (or at least some) in the facility are provided with a playcard reader. When a playcard is read at a given tee-off bay, the launch sensors and read-out means associated with the given tee-off bay are activated. The player can opt to use only the basic read-out indicators or to use a portable computer. The player's portable computer must be programmed to link with data and control instructions specific to the identification code held on his or her playcard. If preferred, some users of the facility can hit balls off the tee-off bays without using a playcard, but in this case the data link associated with their tee-off bays is not activated.

The target sensors 7 may also be configured to measure the rebound of balls that land on a target. These measurements are not used for shot identification as the rebound is strongly dependent on randomly variable ground conditions such as surface irregularities and impact absorption, etc. However, the additional data is very useful to golfers as it provides direct information regarding the actual bounce of a golf ball after its carry trajectory and from that, the likely extent of the final run (i.e. bounce and roll) of the ball. Moreover, the prediction of subsequent bounce and roll can be fairly accurately calibrated for a given terrain.

Figure 2:
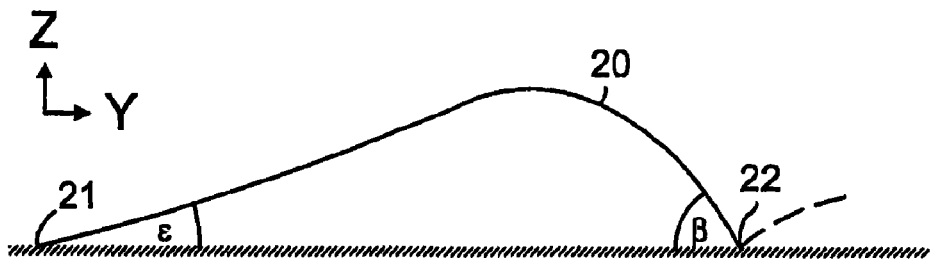
FIG. 2 is a diagram showing the general shape of a golf shot in side elevation.

FIG. 2 is a diagram showing the general shape of a golf shot in side elevation. The carry trajectory 20 comprises the ball flight path from its initial launch spot 21 to its first rebound spot 22. Note that the carry trajectory is asymmetrical with the initial launch elevation angle $\epsilon$ smaller than the descent angles $\beta$ (both these angles being relative to the horizontal). This asymmetry ($\beta > \epsilon$) is almost always true of actual golf shots but for short chip shots (e.g. 25 meters or less) the trajectory is nearly symmetric.

Figure 3:
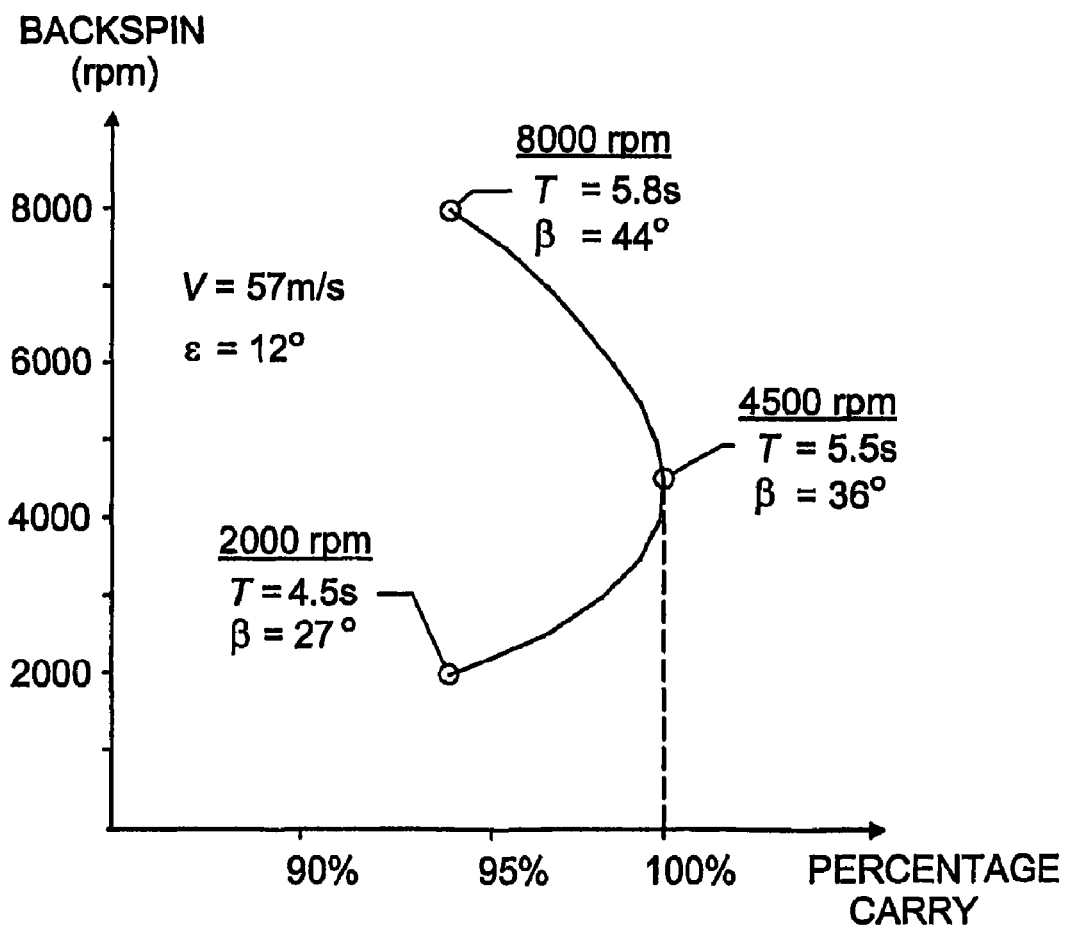
FIG. 3 is a graph of carry distance versus backspin for a representative golf shot.

FIG. 3 shows a plot of percentage carry distance as a function of backspin for a typical drive with launch angle of 12 degrees and launch velocity of 57 m/s in calm conditions. Values of carry length and carry duration were computed using standard formula and models for lift and drag coefficients that are known to approximately simulate the performance of actual golf balls. The maximum carry is shown to occur when the backspin is about 4500 rpm but the carry distance reduces by less than 5% for a wide range of backspins from below 3000 rpm to above 7000 rpm. We show the time of flight T and the descent angle $\beta$ at three points on the plot, namely at 2000 rpm, 4500 rpm and 8000 rpm. This shows that increasing backspin also increases the flight time T and the descent angle $\beta$.

There is strong correlation between flight duration and descent angle. This follows from the fact that a ball that stays in the air for longer, compared to another ball that carries the same distance, must climb higher in the air and will therefore have steeper descent. In the absence of wind and provided that all the balls in a facility have closely matched aerodynamic properties, the time of flight T of any ball can be determined with great accuracy simply by measuring the descent angle $\beta$. In general, wind and variations in surface roughness (which affect aerodynamic properties) will also affect T.

Surface roughness can be both intentional (such as the golf ball dimple pattern moulded onto the surface at manufacture) and accidental (e.g. roughness caused by cuts, abrasion, surface contamination and the like). The relationship between surface roughness and aerodynamic properties is highly complex but for simplicity we assume herein that increased surface roughness is accompanied by increased aerodynamic drag and lift forces. The aerodynamic forces on a ball are normally proportional to the square of the ball's velocity through the surrounding air.

One aspect of the present invention is based on the realisation that, to a first order, wind, backspin and surface roughness all have a similar effect on ball flight. Headwinds have the effect of increasing the lift and drag forces on a ball because they increase its velocity relative to the surrounding air whereas tailwinds have the opposite effect. Thus, the common effect of high backspin, headwinds and high surface roughness is an increase in flight duration T and an increase in descent angle $\beta$ for a given carry distance. Conversely, low backspin, tailwinds and low surface roughness equate to short flight durations and shallow descent angles.

Figure 4A:
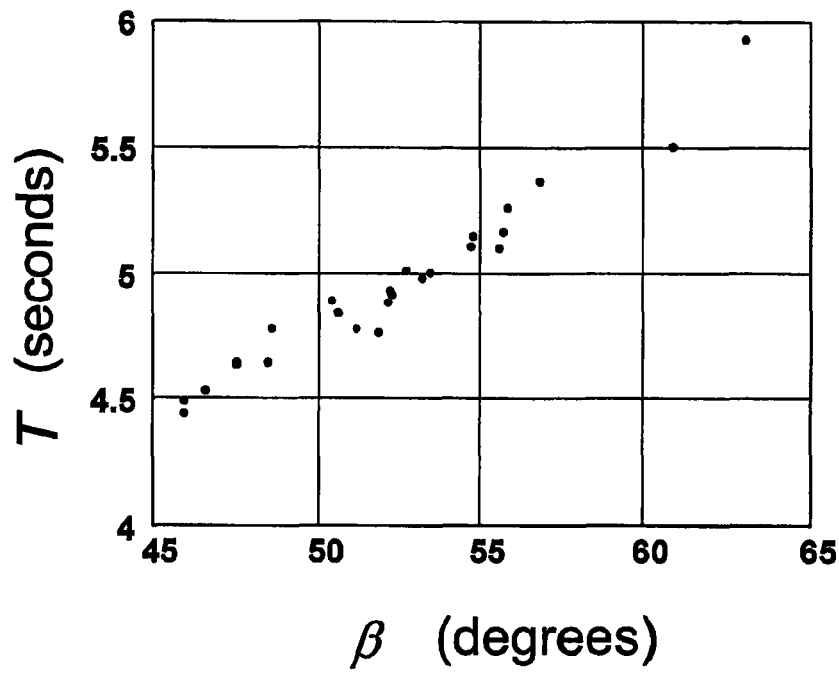
FIGS. 4(a) and 4(b) are plots of flight duration T versus descent angle β for simulated golf shots.
Figure 4B:
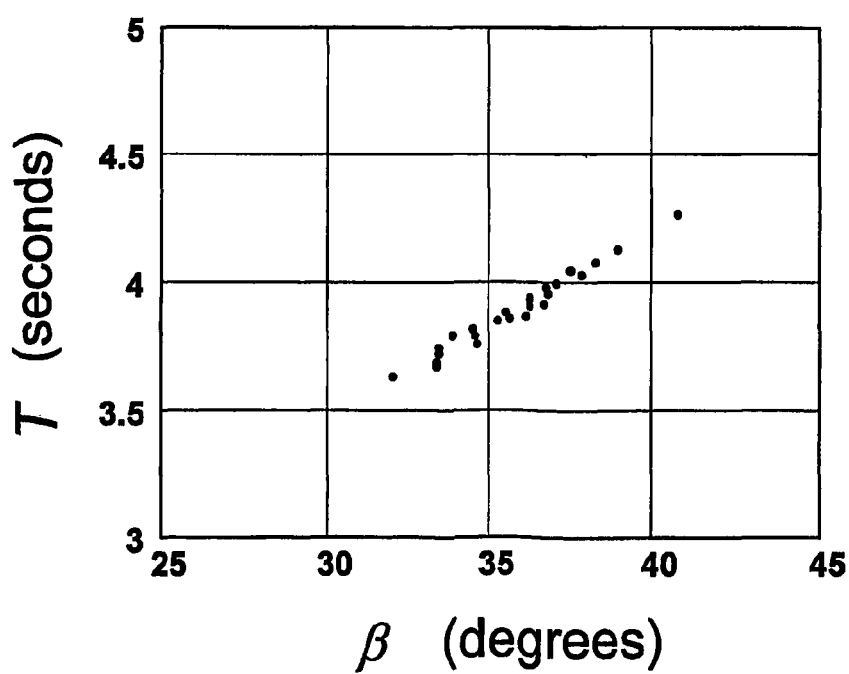

FIGS. 4(a) and 4(b) are plots of flight duration T as a Function of $\beta$, with data obtained by simulation.

In plot 4(a) all shots carried 91.4 meters (100 yards) against a headwind that randomly varied from 3.5 m/s to 8.5 m/s with average value 6 m/s. The launch angles varied randomly from 27.0 to 33.4 degrees and initial backspin also varied randomly with average value of 2710 revolutions per minute (RPM). For each shot, launch speed was adjusted to give 91.4 meters carry with the average launch speed being 36.7 m/s.

The data for plot 4(b) was obtained using the same random values of launch angles but assisted by varying tailwinds averaging 6 m/s. The average launch speed required to achieve 91.4 meters carry with tailwinds reduced to 33.6 m/s, with correspondingly lower average backspin of 2500 RPM. The plots show that headwinds significantly increase flight duration and also cause a greater scatter in the data compared to tailwinds.

It is evident from the plots of FIGS. 4(a) and 4(b) that the relationship between T and $\beta$ is nearly linear in each case. Thus, a best fit line through each set of data would give a very accurate estimate of T as a function of $\beta$. We can thus form a simple equation to find an estimate of expected flight duration $Edur_k$ as a function of $\beta$, where k takes a value of 1 to K and K is the total number of 'possible shots' determined by the identification process.

$$Edur_k = C1_k + C2_k \times \beta \quad (1)$$

Equation (1), either as expressed above or in alternative form is not known, nevertheless it provides very accurate estimates of flight duration $Edur_k$ irrespective of the ball roughness, prevailing wind and imparted backspin.

The constants $C1_k$ and $C2_k$ may be determined purely as a function of the carry distance from the kth tee-off bay to the descent position but, especially for long carry distances, they are preferably determined from several parameters including carry distance, wind speed, wind direction, launch angle, launch speed and air density.

It is preferable to choose values of $C1_k$ and $C2_k$ that are specific to a small range of values of $\beta$ and preferably to a small range of values of down-range wind speed as measured by at least one anemometer. Headwinds produce the greatest errors (compared to calm conditions or tailwinds) because this increases aerodynamic effects and increases flight duration for a given carry length. This is evident in the plots of FIGS. 4(a) and 4(b), which correspond to headwinds and tailwinds respectively.

Wind, measured at a fixed point, is seldom steady but usually fluctuates with typically gusts of wind of 1.3 to 1.6 times the average and with gust duration as little as two or three seconds (i.e. less than half the flight duration of a typical driver shot). Furthermore, *Taylor's Frozen Turbulence Hypothesis* teaches that wind turbulence is transported along the direction of the overall average wind and at the speed of the overall average wind. Thus, if the mean wind speed is 5 m/s, a wind gust of certain strength and duration at point A will approximately replicate two seconds later at a point B that is 10 meters downwind of point A. This 'frozen turbulence' has important implications in relation to wind effect on ball flight. Golf ball speeds are much greater than average wind speeds experienced in a driving range. Consequently, the ball flies quickly through wind gusts so that the highs and lows of gusting wind along the flight path are averaged out. Thus in gusting wind, the instantaneous wind speed experienced by a ball changes several times throughout the flight but the average wind speed for the first half of a ball flight is usually nearly the same as the average wind speed during the second half of the flight. This is especially the case for gusting headwinds. Thus, for the purpose of simulating the effect of headwind on ball flight, it is reasonable to assume that balls experience constant wind speed throughout their flight.

Using simulation, we can find appropriate values for $C1_k$ and $C2_k$ at different carry distances. Table 1 shows the results of simulation studies where headwinds were randomly varied from 3.5 to 8.5 meters per second and where launch angles and backspins were randomly varied to produce a spread of values for $\beta$. Launch speeds were adjusted to give the stated carry distance.

TABLE 1

| Carry Distance (yards) | Duration Min/Max (seconds) | $\beta$ Min/Max (degrees) | $C1_k$ (seconds) | $C2_k$ (sec/deg) | $\sigma$ (ms) |
|---|---|---|---|---|---|
| 50 | 2.7/3.3 | 35.7/47.8 | 0.94 | 0.048 | 27 |
| 100* | 4.4/5.9 | 45.9/63.0 | 0.97 | 0.076 | 70 |
| 200 | 4.3/6.4 | 24.8/49.7 | 2.2 | 0.085 | 86 |

*Data from FIG. 4(a)

It is to be noted that in general the values of $C1_k$ and $C2_k$ vary with dependence on k, but to generate the data for Table 1 we simulated shots with exact carry distances as shown and prevailing headwind averaging 6 meters per second so, in this circumstance, $C1_k$ and $C2_k$ have fixed values for each of the three carry distance simulations.

The last column in Table 1 gives the standard deviation of estimated errors in milliseconds. The errors are very low and only require measurement of $\beta$ and an approximate measurement of the prevailing wind conditions. No knowledge of the launch speeds, backspins or launch angles are required. To gain advantage of these estimate accuracies, the value of $\beta$ must be measured very precisely since the value of the constant $C2_k$ is typically of the order of 40 to 90 milliseconds per degree. Thus a measurement error of 1.0 degree in $\beta$ will itself generate an estimate error of 40 to 90 milliseconds. It is thus preferable that the measurement of the descent parameters involves errors of less than 1.0 degree standard deviation and more preferably less than 0.5 degree standard deviation for measurement of the descent elevation angle of a ball.

Because the errors in flight duration estimates are generally very small, identification of the impact location of a descending ball can be determined in many instances purely from calculation of this parameter. This enables very fast identification.

Figure 5:
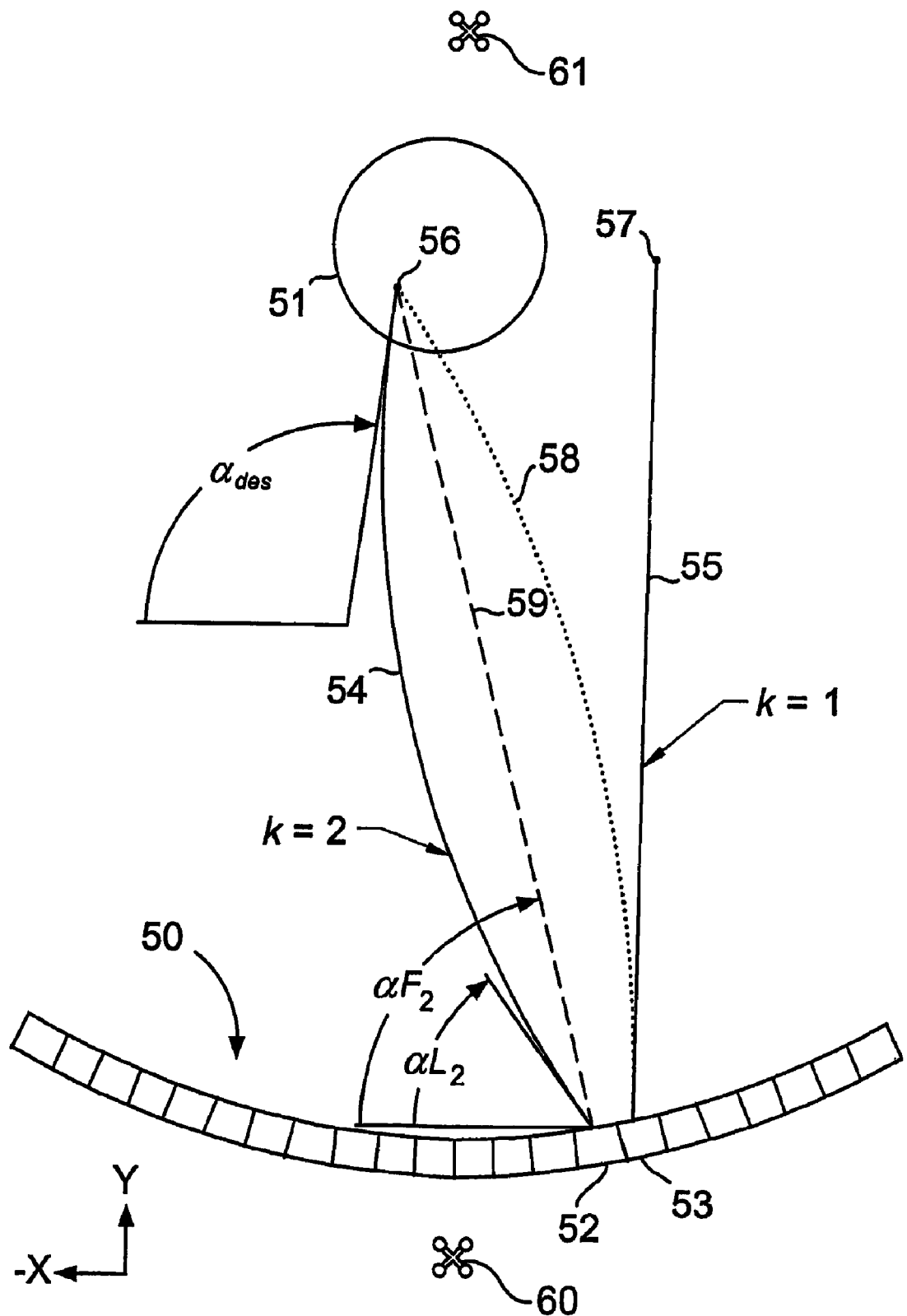
FIG. 5 is a schematic plan view of a driving range showing the trajectory paths of two exemplary golf shots.

FIG. 5 is a plan view of a typical golf facility with tee-off bays arranged in a circular arc 50 and a distant target 51 situated in the outfield. In this example, the target may be 100 to 200 meters or more from the tee-off bays so that significant slicing and hooking can occur. In a hypothetical scenario, two golfers in adjacent bays 52 and 53 hit shots simultaneously with nearly identical launch speeds, elevation angles and backspins such that their shots carry equal distances and land simultaneously, but the shot from tee-off bay 52 is hit with slicing spin whereas the shot from tee-off bay 53 has no sidespin and there is no crosswind influencing either flight path.

Solid line 54 shows the azimuth trajectory of the shot from tee-off bay 52 and solid line 55 shows the azimuth trajectory of the shot from tee-off bay 53. Shot 54 descends inside the target 51 at spot 56 whereas shot 55 descends outside on the right of the target at spot 57. However, if shot 55 had been struck with hooking sidespin as shown by the dotted line 58, it could have descended at exactly the same spot (56) as shot 54.

A central computer (not shown) has to identify the tee-off bay from where the ball that descended on spot 56 originated. In this case, both tee-off bays are selected as probable candidates with tee-off bay 52 assigned k=2 and tee-off bay 53 assigned k=1. However, the actual impact times $Dur_2$ and $Dur_1$ correspond to the estimated $Edur_2$, but measured differences in azimuth angles provide the means of selecting tee-off bay 52 and rejecting tee-off bay 53.

At the tee-off bays, the initial azimuth launch angle $\alpha L$ of every shot is measured and at each target the azimuth angle of descent $\alpha_{des}$ of any ball that reaches a target is measured. All angles are measured with reference to a fixed direction and measured in either a clockwise or anti-clockwise rotation. In FIG. 5 we show the angles measured with reference to the $-X$ axis in a clockwise rotation. For each impact point and each descent position there is a further angle that we call the final angle $\alpha F$, which is the angle subtended by a hypothetical straight line between the impact point and the descent position (shown for shot 54 in FIG. 5 as the dashed line 59).

Because shot 55 is straight, the initial launch angle, the final angle and the descent angle are all equal. For shot 54 the slicing spin causes the azimuth trajectory to curve in an approximately circular arc so these angles are all different. The azimuth trajectory is not exactly circular, especially if crosswinds affect the flight path, but in a surprisingly large number of instances we find (from simulation) that $(\alpha F - \alpha L)$, closely equals $(\alpha_{des} - \alpha F)$, which corresponds to a circular arc.

We can use this relationship to accurately estimate the azimuth direction $Edir_k$ of a ball from measurements of $\alpha F_k$ and $\alpha L_k$. For a given shot, a close match between the value of $Edir_k$ found from a given tee-off bay and $\alpha_{des}$ indicates a high probability that the said given shot is correctly matched to the said given tee-off bay. Referring again to FIG. 5, since the value of $Edir_2$ as estimated for tee-off bay 52 closely matches the measured value of $\alpha_{des}$, the central computer can correctly identify tee-off bay 52 as the source of shot 54 whereas $Edir_1$ does not match the measured value of $\alpha_{des}$.

In general $Edir_k$ is found from the following equation:

$$Edir_k = \alpha F_k + C3_k \times (\alpha F_k - \alpha L_k) \quad (2)$$

We find from simulation that putting the factor $C3_k$ equal to 1.0 gives generally good estimates for the majority of possible golf shots. More preferably, $C3_k$ is dependent on carry distance and at least one of; crosswind magnitude and direction, carry deviation, total wind speed and direction, launch elevation angle, launch speed, carry duration and air density.

Optionally, one anemometer 60 is positioned near the tee-off bays 50 and a second anemometer 61 is positioned at the far end of the outfield. The anemometers preferably use 2-axes sonic sensing means capable of resolving very short term variations in wind speed and direction. Data from the anemometers, which may be recorded at sampling rates of 10 samples per second or greater, are used to compute the approximate wind speed and wind direction throughout the outfield by a process of interpolation and extrapolation. The anemometers are preferably mounted on masts at a height of 10 meters or so or at the expected average height of golf shots. In other arrangements, only one 2-axis anemometer is used to obtain a rough estimate of current wind strength and direction or several anemometers, which may be 2 or 3-axes types, are used to obtain more accurate estimates. Special, purpose built anemometers can be provided where the path length for the sonic measurement extends several meters rather than a few centimeters as is usual in commercially available devices.

Figure 6:
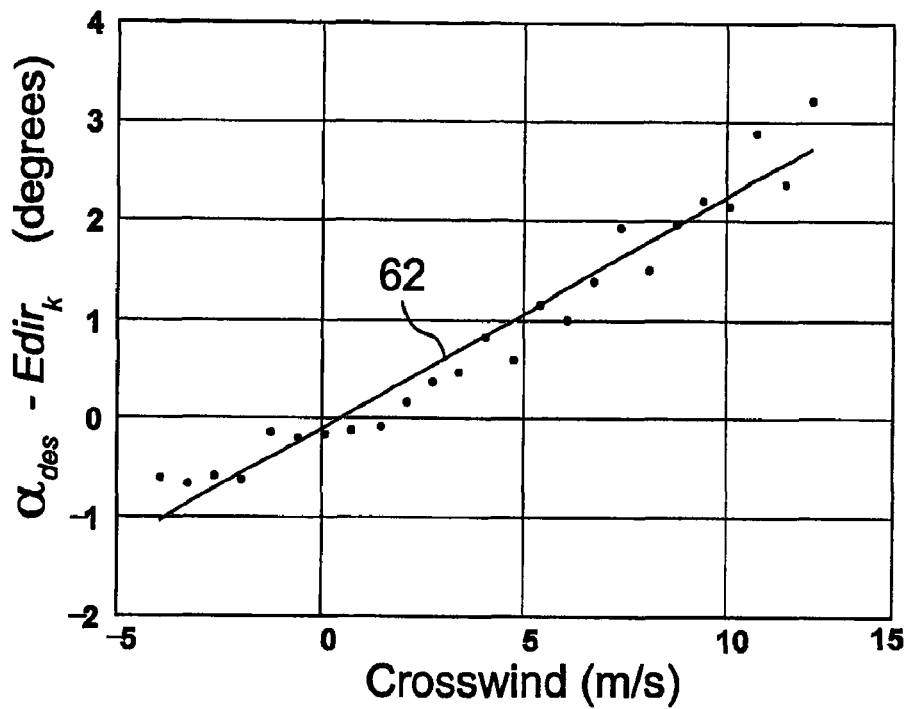
FIG. 6 is a plot of azimuth angular errors as a function of crosswind speed for simulated golf shots.

FIG. 6 is a plot of errors in $Edir_k$ as a function of crosswind speed for simulated drive shots. Each shot in the sample carried 220 meters (240 yards) and was launched with random elevation angles and backspin. Additionally, each shot had a large (randomised) sidespin component, which was sufficient to result in an average 27 meter deviation in calm conditions. The crosswind was varied from −4 m/s to +12 m/s (where negative crosswind assisted the sidespin deviation and vice versa). A best fit line 62 passes through the data points and shows the general trend of the errors. At low crosswinds the errors are negligible but there is a gradual increase in errors as crosswinds increase. This gradual increase is less than 0.25 degrees per m/s of crosswind. We find that the standard deviation of errors relative to the best fit line 62 is less than 0.25 degrees. This is almost $1/100^{th}$ of the average angular deviation caused purely by the imparted sidespin. It is thus evident that Equation (2) combined with corrections for crosswind (if measured) can provide extremely precise estimation of $Edir_k$ even when high sidespin and crosswind are present.

To ensure that there is very low probability of miss-match, it is preferable to include, as a possible match, any tee-off bay where the difference between the actual impact time and the estimated carry duration $Edur_k$ is less than 3-sigma or even less than 4-sigma. This will sometimes result in two or more tee-off bays being included as possible matches even when the 3-sigma has a value of one tenth of a second or so. We then use $Edir_k$ to make a selection between the said two or more tee-off bays. An even higher certainty of correct match can be provided by including a third parameter in the matching process that matches the descent velocity of a shot with a probable launch velocity. We have found that the ratio of a ball's horizontal velocity at launch to its horizontal velocity at descent (which we call herein the 'deceleration ratio') can be accurately estimated even when the ball has decelerated considerably along its carry length.

Figure 7:
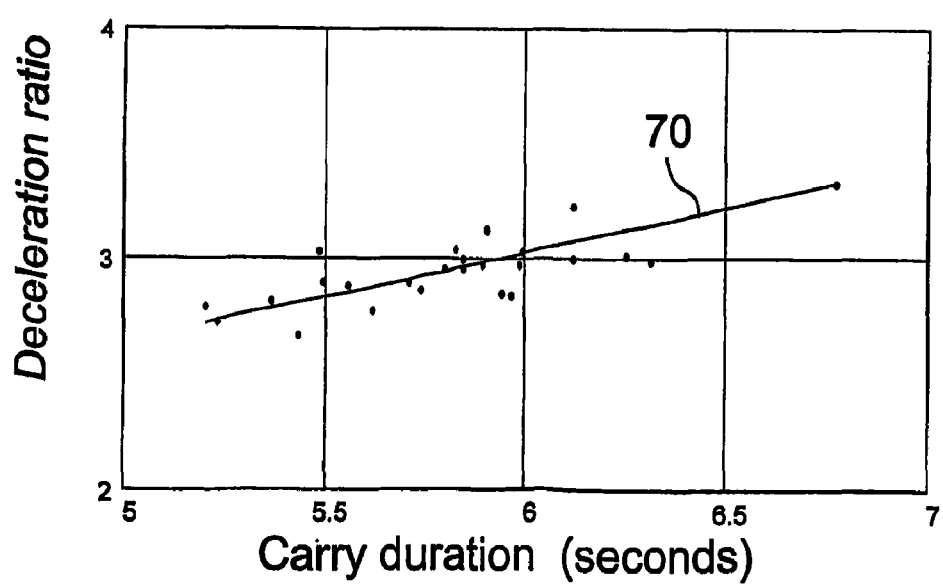
FIG. 7 is a plot of deceleration ratios as a function of carry duration for simulated golf shots.

FIG. 7 is a plot of simulated golf shots showing variation in deceleration ratio against carry duration. All the shots in FIG. 7 were subjected to randomised values of launch angle, backspin and wind, with launch speeds adjusted to give equal carry distance of 220 meters (240 yards). The variations in the initial launch parameters were: speed 69.4 to 77.2 m/s, backspin 1010 to 3140 RPM and elevation launch angle 12 to 14 degrees. Additionally, wind along the direction of flight varied in the range ±1.3 m/s (±3 mph). These data represent very long drives, typical of tour players or very good amateur players.

We see from FIG. 7 that there is good correlation between deceleration ratio and flight duration, which varied from 5.2 to 6.8 seconds. Line 70 is the best linear fit through the data. The equation for this line, which is shown below, gives the optimum value of an estimate for the deceleration ratio $Edec_k$ for the kth 'possible tee-off bay' as a function of the kth 'possible flight duration' $Dur_k$.

$$Edec_k = C4_k + C5_k \times Dur_k \quad (3)$$

The constants $C4_k$ and $C5_k$ are mainly dependent on launch elevation angle, achieved carry distance, wind speed, wind direction and air density.

Despite the fairly large range of launch conditions, we find that the distribution of the errors between $Edec_k$ and actual data in FIG. 7 has standard deviation of only 3.2%. For the great majority of shots, $Edec_k$ is even closer to actual. This is especially true for shots with significantly lower launch speeds since the deceleration ratio then approaches unity and errors become negligible. Thus, provided reasonably accurate measurements of launch horizontal speed, launch elevation angle and descent horizontal speed are available, the differences between $Edec_k$ and possible matches of deceleration ratios at various tee-off bays provides a very reliable means of identifying golf shots. The accuracy of $Edec_k$ is further improved if measurements of wind speed and direction are available.

The shot identification process relies on evaluating the probability that the actual impact time and additionally (if required), the actual launch direction and/or the actual launch horizontal speed, of one of a plurality of shots from the tee-off bays correspond to the measured descent parameters of a ball. To estimate this probability, data from a sample of previous shots are first analysed to find $Edur_k$, $Edir_k$ and $Edec_k$, which are the values of the three relevant parameters having the highest probability density. The distribution of results above and below $Edur_k$, $Edir_k$ and $Edec_k$ then give values for the three corresponding standard deviations of errors from which probabilities can be estimated. It is not practical to determine $Edur_k$, $Edir_k$ and $Edec_k$ and their standard deviations for every possible combination of descent parameter, wind parameters and launch parameters but data analysis can generate a model so that the values for any specific set of conditions can be determined from interpolating values from look-up tables or other computation means.

With the very small differences between $Edur_k$, $Edir_k$ and $Edec_k$ and actual parameters for 'close possibility shots', the error distributions are likely to be symmetrical and normal so the probabilities can be found using standard formulae.

For example, the probability that the impact time of the kth shot in a set of possible shots was the actual time when a given descending ball was hit is given by:

$$P(Dur_k) = 1 - 2 \times |F(Dur_k) - 0.5| \quad (4)$$

Where F(Dur$_k$) is the cumulative probability function for Dur$_k$. The probabilities for direction and deceleration are found with a similar method.

Figure 8:
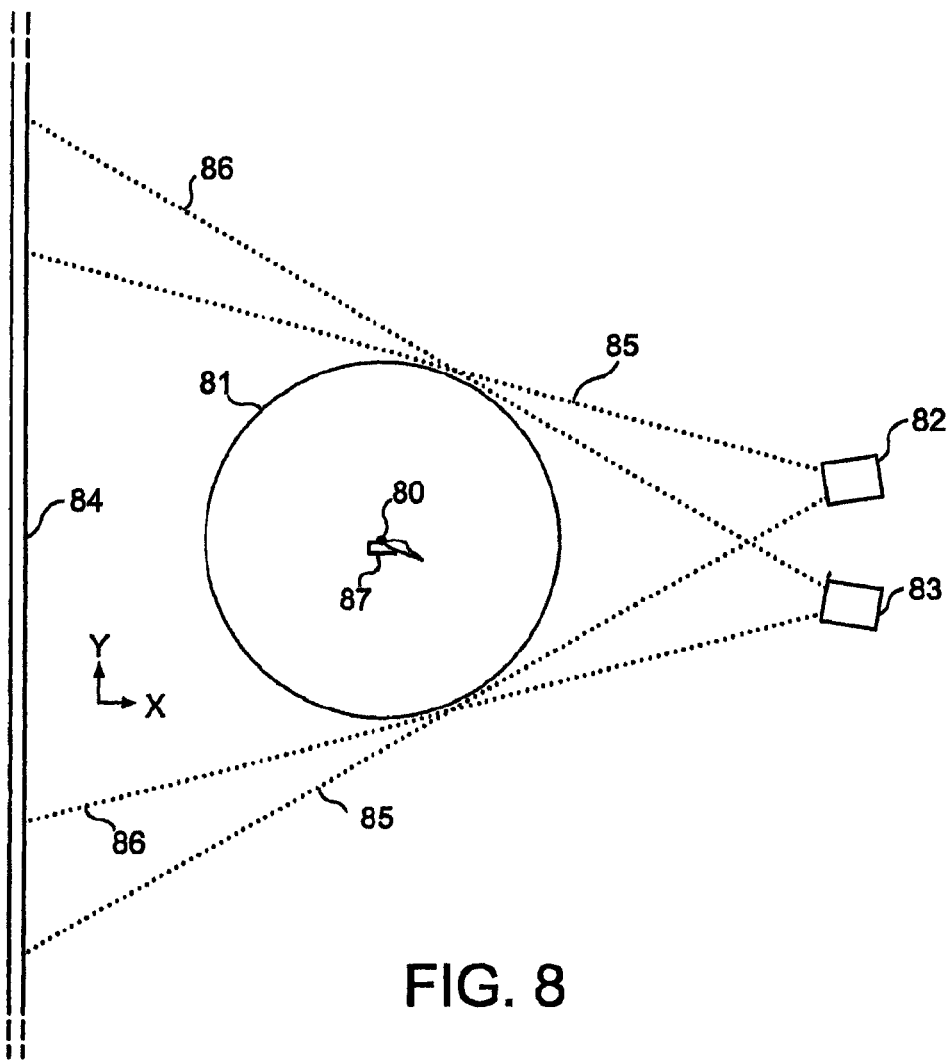
FIG. 8 is a plan-elevation of a target and ball descent measurement apparatus according to the invention.
Figure 9:
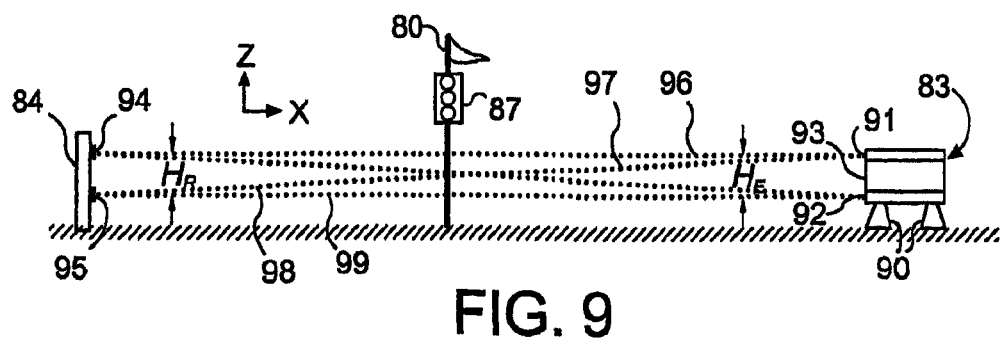
FIG. 9 is a side elevation of the target and ball descent measurement apparatus of FIG. 8.

Referring now to FIGS. 8 and 9, a flagpole 80 marks the centre of a circular target 81, which is situated in the centre of a golf driving range and typically at a distance of 50 to 250 meters from a row of several tee-off bays (not shown). Several such targets may be disposed along the length of the range and may vary in size and shape. The border of the target may be marked out so as to be visible to players in the tee-off bays or the target 81 may simply be designated as a circular area on the outfield with fixed radius from the flag pole 80.

Two sensor units 82 and 83 are rigidly fixed slightly above ground level by supports 90 and positioned on the right of the target and preferably near the extreme right hand border of the range where golf balls are not normally expected to land. A reflectors structure 84 runs the length of the range (or lesser length as required) on the opposite side of the target on the extreme left hand side where again, golf balls are not normally expected to land.

The positions of the sensor units and reflectors structure may be reversed or, if preferred, sensor units and reflectors structures may be installed on both sides of the target.

The sensor units each comprise an upper light emitter 91 and a lower light emitter 92 mounted above and below a co-acting light receiver 93. The light receivers for sensor units 82 and 83 each have angular horizontal fields of view, denoted by dotted lines 85 and 86 respectively, which are sufficient to span across the target 81 (e.g. 45 degrees or so) but with offset axes directions as shown. The light emitters for sensor units 82 and 83 have horizontal light radiation fields that extend at least beyond the field of view of their co-acting light receivers. Both light emitters 91 and 92 in each sensor unit have vertical light radiation fields that diverge only slightly but sufficient to illuminate two separate retro-reflective strips 94 and 95 that are attached to the facing side of the reflectors structure. The vertical separation H$_R$ of the retro-reflective strips 94 and 95 and the vertical separation H$_E$ of each pair of light emitters 91 and 92 are preferably equal and, without limitation, in the range 10 to 50 centimeters.

Preferably, the light emitters are energised cyclically so that both upper light emitters 91 are ON and both lower light emitters 92 are OFF on one half-cycle and vice versa on alternate half-cycles. During each half-cycle, light reflected from one pair of light emitters is reflected from the retro-reflector strips 94 and 95 and received by the light receivers 93, which preferably have large apertures and high gain condensing optics. The light receivers 93 focus the said reflected light onto one or more linear light sensor arrays (not shown) within the light receiver sub-system.

The retro-reflective strips 94 and 95 are of uniform vertical width in the range 20 to 30 millimeters, e.g. 25 millimeters, which is slightly smaller than the diameter of a golf ball, and the vertical aperture of the light emitters are arranged to have the same height as the retro-reflective strips 94 and 95, e.g. 25 millimeters.

When light emitters 91 are ON, a fan beam of typically infrared light illuminates a section of the retro-reflective strips 94 and 95 and this fan beam contains two light paths denoted by dotted lines 96 and 97. When a golf ball enters light path 96, part of the light from retro-reflector 94 is interrupted and this is detected in both sensor units 82 and 83. In each light receiver, at least one light sensor array pixel will detect the light interruption. Note that the said at least one pixel will still receive light from retro-reflector 94 via path 97 so the signal in the said at least one pixel changes by −6 db and this is sufficient to reliably detect the presence of a golf ball within light path. The angular position of the light interrupting golf ball relative to both sensor units 82 and 83 can be determined by the respective position of the detecting pixels. The instantaneous height of the light interrupting golf ball is determined by the height of the light path 96. Thus, knowing the angular positions of the golf ball relative to the two sensor units and its height, its instantaneous position in three dimensions can be determined. As the ball passes through all four light paths 96 to 99, its velocity vectors can be measured. Note that the intermediate light paths 97 and 98 are not required for the measurement of ball velocity vectors but are present nevertheless as it is impractical to focus the fan beam from light emitter 91 onto only retro-reflector 94 but not 93 and similarly it is impractical to focus the fan beam from light emitter 92 onto only retro-reflector 95.

The flag pole 80 can be provided with a shot indicating means 87 comprising three different coloured light beacons that are switched ON according to the proximity of detected golf balls to the flagpole. This provides a method of awarding 'scores' dependent on accuracy and distance of different golf shots.

A modified version of the sensor units and retro-reflective strips of FIGS. 8 and 9 may be used to measure launch parameters in the tee-off bays. In this case, the light fan beams and fields of view of the light sensors are preferably orientated in a vertical plane.

The invention claimed is:

1. A method for identifying in respect of a descending golf ball a position from among a plurality of launch positions from which the descending golf ball was launched, the method being performed by a computer and comprising the steps of:

measuring, via sensors, descent parameters of the descending golf ball to derive at least a time of descent of the descending golf ball, within a last 10% of a carry trajectory of the descending golf ball, and a measure dependent on angle of descent in elevation of the descending golf ball;

calculating, via the computer, a calculated estimate of flight duration of the descending golf ball as a function of the measure dependent on the angle of descent in elevation of the descending golf ball;

measuring, via sensors, in respect of each launch position a measured interval of time between launch of a golf ball from an individual launch position of the plurality of launch positions and the time of descent of the descending golf ball;

comparing, via the computer, the measured interval of time measured in respect of each launch position with the calculated estimate of flight duration of the descending golf ball to determine for which of the launch positions, of the plurality of launch positions, the respective measured interval of time is a close match with the calculated estimate; and identifying, via the computer, the launch position from which the descending golf ball was launched with the launch position for which the close match exists.

2. The method according to claim 1, further comprising the step of measuring descent component velocities of the descending golf ball when measuring the descent parameters.

3. The method according to claim 1, further comprising the step of calculating the calculated estimate of flight duration according to a linear function of the angle of descent in elevation of the descending golf ball.

4. The method according to claim 3, further comprising the step of determining the linear function as a sum of at least two terms with a first of the two terms being a constant and a second of the two terms being a product of a constant and the measurement dependent on the angle of descent in elevation of the descending golf ball.

5. The method according to claim 4, further comprising the step of having the constant of the first term and the constant of the second terms each depend upon a carry distance.

6. The method according to claim 4, further comprising the step of having the constant of the first term and the constant of the second term each depend on at least one of:
 a carry distance,
 a wind speed,
 a wind direction,
 a launch angle,
 a launch speed,
 an air density,
 a descent velocity of the descending golf ball, and
 a descent angle in azimuth of the descending golf ball.

7. The method according to claim 1, further comprising the step of detecting descent parameters of the descending golf ball and determining the angle of descent in azimuth of the descending golf ball, and the step of identifying the position from which the descending golf ball was launched includes discriminating between the launch positions of launched golf balls for which the close match exists to identify the position from which the descending golf ball was launched, the discrimination being based on the extent to which, in respect of each of the launched golf balls for which the close match exists, there is a match between the measure dependent on the angle of descent in azimuth of the descending golf ball and a calculated estimate of the angle of descent in azimuth of the descending golf ball, and wherein the calculated estimate for the angle of descent in azimuth of the descending golf ball is calculated as a function of a measure of the launch angle in azimuth of the subject launched golf ball and a measure of bearing of the descending golf ball from the launch position of the subject launched golf ball.

8. The method according to claim 7, further comprising the step of calculating the calculated estimate of the angle of descent in azimuth of the descending golf ball as a sum of the measure of a bearing of the descending golf ball from the launch position of the subject launched golf ball and a term dependent on difference between this bearing and the measure of the launch angle in azimuth of the launched golf ball.

9. The method according to claim 1, further comprising the step of deriving, from the measured descent parameters, a measure of horizontal velocity of the descending golf ball, and the step of identifying the position from which the descending golf ball was launched includes discriminating between the launch positions of launched golf balls for which the close match exists, the discrimination being based on the extent to which in respect of each of the launched golf balls for which the close match exists there is a match between: (a) a calculated ratio of a measure of the horizontal velocity of the subject launched golf ball at launch to the measure of the horizontal velocity of the descending golf ball, and (b) a function dependent on a value for expected flight duration of the subject launched golf ball from its launch position.

10. The method according to claim 1, further comprising the step of measuring the descent parameters of the descending golf ball at a distance of less than 2 meters above ground level.

11. A system for a golf facility for identifying in respect of a descending golf ball a position from among a plurality of launch positions from which the descending golf ball was launched, the system comprising:
 sensor means for measuring descent parameters of the descending golf ball, within a last 10% of a carry trajectory of the descending golf ball, and the descent parameters comprising a time of descent of the descending golf ball and a measure dependent on an angle of descent in elevation of the descending golf ball;
 sensor means for measuring launch parameters of golf balls launched from the plurality of launch positions, and the launch parameters comprising, in respect of each of the launch positions, a time of golf-ball launch therefrom;
 computer means responsive to the measure dependent on the angle of descent in elevation of the descending golf ball for calculating an for calculating a calculated estimate of flight duration of the descending golf ball as a function of the measure dependent on the angle of descent in elevation of the descending golf ball;
 the computer means being responsive to the time of golf-ball launch from each of the launch positions and the time of descent of the descending golf ball to calculate, in respect of each of the plurality of launch positions, a calculated interval of time between golf-ball launch from that position and the time of descent of the descending golf ball;
 the computer means being operative to compare the calculated estimate of flight duration of the descending golf ball, with the calculated interval of time in respect of each of the plurality of launch positions, to determine which launch position, of the plurality of launch positions, the calculated interval of time is a close match with the calculated estimate of flight duration; and
 the computer means identifying the launch position, from which the descending golf ball was launched, with the launch position for which the close match exists.

12. The system according to claim 11, wherein the measured descent parameters include measures of descent component velocities of the descending golf ball.

13. The system according to claim 11, wherein the calculated estimate of flight duration is calculated according to a linear function of the angle of descent in elevation of the descending golf ball.

14. The system according to claim 13, wherein the linear function is a sum of at least two terms, a first term of the two terms being a constant and a second of the two terms being a product of a constant and the measure dependent on angle of descent in elevation of the descending golf ball.

15. The system according to claim 14, wherein the constant of the first term and the constant of the second term are each dependent upon a carry distance of the descending golf ball.

16. The system according to claim 14, wherein the constant of the first term and the constant of the second term are each dependent on at least one of:
 a carry distance,
 a wind speed,
 a wind direction,
 a launch angle,
 a launch speed,
 an air density,
 a descent velocity of the descending golf ball, and
 a descent angle in azimuth of the descending golf ball.

17. The system according to claim 11, wherein the computer means further determines, from the measured descent parameters of the descending golf ball, a measure of the angle of descent in azimuth of the descending golf ball, and the computer means further discriminates between the launch positions of launched golf balls for which the close match exists to identify the launch position from which the descending golf ball was launched, the discrimination being based on the extent to which, in respect of each of the launched golf balls for which the close match exists, there is a match between the measure dependent on the angle of descent in azimuth of the descending golf ball and a calculated estimate of the angle of descent in azimuth of the descending golf ball, and this calculated estimate for the angle of descent in azimuth of the descending golf ball is calculated as a function of a measure of the launch angle in azimuth of the subject launched golf ball and a measure of bearing of the descending golf ball from the launch position of the launched golf ball.

18. The system according to claim 17, wherein the calculated estimate of the angle of descent in azimuth of the descending golf ball is a sum of the measure of a bearing of the descending golf ball from the launch position of the launched golf ball and a term dependent on a difference between this bearing and the measure of the launch angle in azimuth of the launched golf ball.

19. The system according to claim 11, wherein the computer means further derives, from the measured descent parameters, a measure of horizontal velocity of the descending golf ball, and the computer means further discriminates between the launch positions of launched golf balls for which the close match exists, the discrimination being based on the extent to which in respect of each of the launched golf balls for which the close match exists there is a match between: (a) a calculated ratio of a measure of the horizontal velocity of the subject golf ball at launch to the measure of the horizontal velocity of the descending golf ball, and (b) a function dependent on a value for expected flight duration of the subject launched golf ball from its launch position.

20. The system according to claim 11, wherein the system further comprises sensors for measuring the descent parameters of the descending golf ball at a location less than 2 meters above ground level.

* * * * *